United States Patent [19]

Tadokoro et al.

[11] Patent Number: 4,909,035
[45] Date of Patent: Mar. 20, 1990

[54] CONTROL SYSTEM FOR A TURBO-SUPERCHARGER OF AN INTERNAL COMBUSTION ENGINE

[75] Inventors: Tomoo Tadokoro; Ikuo Matsuda, both of Hiroshima, Japan

[73] Assignee: Mazda Motor Corporation, Hiroshima, Japan

[21] Appl. No.: 157,066

[22] Filed: Feb. 2, 1988

Related U.S. Application Data

[63] Continuation of Ser. No. 832,408, Feb. 24, 1986, abandoned.

[30] Foreign Application Priority Data

Feb. 25, 1985 [JP] Japan .............................. 60-24771[U]

[51] Int. Cl.⁴ ............................................. F02B 37/00
[52] U.S. Cl. ..................................................... 60/602
[58] Field of Search ................... 60/600, 601, 602, 603

[56] References Cited

U.S. PATENT DOCUMENTS 3,557,549  1/1971  Webster .................................. 60/13
4,203,296  5/1980  Tanaka .................................. 60/602
4,404,804  9/1983  Tadokoro .............................. 60/602
4,617,799 10/1986  Tadokoro .............................. 60/602
4,658,586  4/1987  Iwasa .................................... 60/602
4,745,753  5/1988  Tadokoro .............................. 60/602

FOREIGN PATENT DOCUMENTS 18522      2/1983  Japan .................................. 60/602
58-138222  8/1983  Japan .

Primary Examiner—Douglas Hart
Attorney, Agent, or Firm—Fleit, Jacobson, Cohn, Price, Holman & Stern

[57] ABSTRACT

A turbo-supercharger for an engine includes a turbine casing formed with two scrolls. A shut-off valve is provided for closing one of the scrolls in a low speed engine operation. The shut-off valve is operated by a pneumatic actuator which is normally biased to force the shut-off valve to the open position. Under a low speed engine operation, the intake suction pressure is applied to the actuator to move the shut-off valve to the closed position.

10 Claims, 1 Drawing Sheet

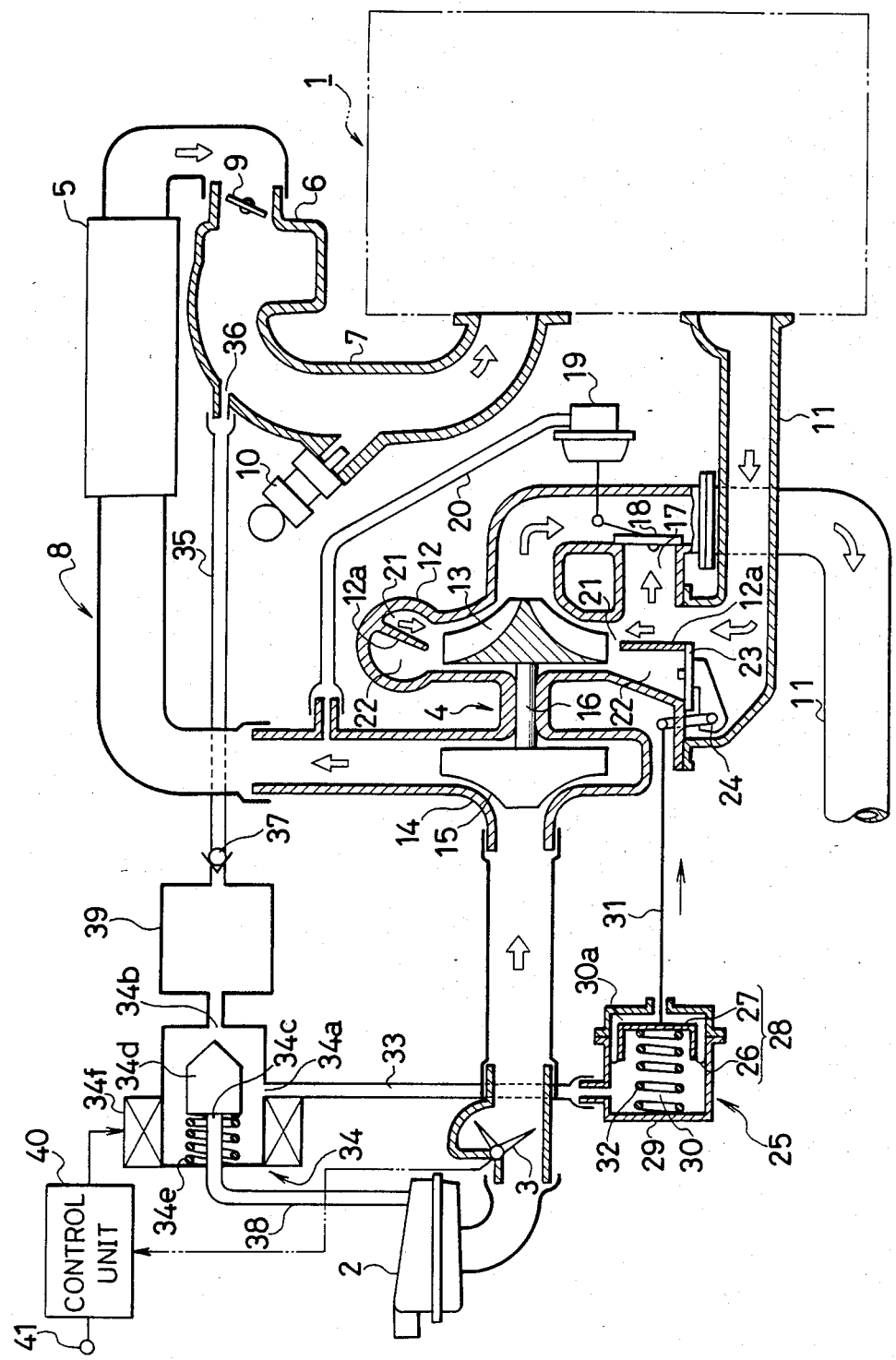

CONTROL SYSTEM FOR A TURBO-SUPERCHARGER OF AN INTERNAL COMBUSTION ENGINE

This application is a continuation of application Ser. No. 832,408, filed Feb. 24, 1986, and now abandoned.

BACKGROUND OF THE INVENTION

1. Field of the Invention

The present invention relates to a supercharger control system for an internal combustion engine, and more particularly to a control system for a turbosupercharger.

2. Description of the Prior Art

It has been recognized in turbo-superchargers for automobile engines that a satisfactory supercharging effect cannot be obtained in a low engine speed range because there is very little exhaust gas energy available for the turbine of the supercharger. In view of the problem in Japanese patent application 57-18708 filed on Feb. 10, 1982 and disclosed for public inspection on Aug. 17, 1983 under the disclosure number 58-138222, there is proposed a turbo-supercharger which has a turbine casing formed with a pair of scroll configurations, one of which is provided with a control valve for closing the exhaust gas passage through the one scroll configuration under a low engine speed range. With this arrangement, it is possible to increase the exhaust gas flow speed to the supercharger turbine even under a low engine speed operation, so that a satisfactory supercharging effect can be accomplished. In the system proposed by the Japanese patent application, the control valve may be operated either by an electro-magnetic actuator or by a pneumatic actuator which is operated under the supercharging pressure.

In this type of turbo-supercharger, it is generally recommendable that the control valve for one of the turbine scroll configurations be held in an open position in case of a failure in the control system from the viewpoint of suppressing an excessive rise in the exhaust gas pressure. Thus, in case where a pneumatic actuator is adopted for operating the control valve, the actuator should preferably be of such a type that functions to normally hold the control valve open under an atmospheric condition. When a pressure representing the low engine speed range is applied to the actuator, it should function to close the control valve and further function to open the control valve under a high engine speed range.

It should be noted however that the supercharging pressure as taught by the Japanese patent application is dissatisfactory to accomplish the aforementioned operation of the actuator It may be considered to utilize the exhaust gas pressure for operating the actuator for the control valve, however, the exhaust gas pressure is also dissatisfactory for the purpose. Further, the exhaust gas may give an adverse thermal effect to the actuator.

SUMMARY OF THE INVENTION

It is therefore an object of the present invention to provide a novel control system for a turbo-supercharger having a variable exhaust gas passage to the turbine of the supercharger.

Another object of the present invention is to provide a turbo-supercharger having a variable exhaust gas passage to the turbine and passage control means for normally maintaining the exhaust gas passage wide open but closing the passage to a minimum opening position in a low engine speed range.

A further object of the present invention is to provide a turbo-supercharger having a variable exhaust gas passage to the turbine and pneumatically actuated passage control means for normally maintaining the exhaust gas passage wide open under the influence of the atmospheric pressure but closing the passage to a minimum opening position under a pressure prevailing in a low engine speed range.

According to the present invention, the above and other objects can be accomplished by a turbo-supercharger for an internal combustion engine having intake passage means provided with throttle valve means and exhaust passage means, said turbo-supercharger comprising compressor means located in said intake passage means, exhaust gas turbine means provided in said exhaust gas passage means and connected with said compressor means to drive the same, variable passage means for directing engine exhaust gas to said turbine means, said variable passage means having at least a first position and a second position wherein an effective passage area is larger than that in said first position, biasing means for biasing the variable passage means to said second position, pneumatic actuator means responsive to a suction pressure for actuating the variable passage means to said first position, suction pressure passage means connecting the intake passage means downstream the throttle valve means with the actuator means to apply the suction pressure to said actuator means in a low engine speed range.

It is preferable that the suction pressure passage means is provided with suction pressure retaining means for retaining the suction pressure in the suction pressure passage means. Such retaining means may be in the form of check valve means which allows transmittal of a suction pressure only toward the actuator means. It is further preferable to provide control valve means in the suction pressure passage means between the suction pressure retaining means and the actuator means to open the passage means in a low speed engine operating range.

The above and other object and features of the present invention will become apparent from the following description of a preferred embodiment taking reference to the accompanying drawing.

BRIEF DESCRIPTION OF THE DRAWING

The drawing show a sectional view of a turbo-supercharger in accordance with one embodiment of the present invention.

DESCRIPTION OF THE PREFERRED EMBODIMENT

Referring to the drawing, there is shown an engine 1 having an intake passage 8 leading to individual intake pipes 7 which are opened to respective combustion chambers of the engine 1 The intake passage 8 is provided at the upstream end with an air cleaner 2. An air-flow meter 3 is provided in the intake pasasge downstream the air cleaner 2. The intake passage 8 is further has a throttle valve 9, and downstream the throttle valve 9, there is a surge tank 6 as well known in the art. In the individual intake pipe 7, a fuel injection valve 10 is provided. As usual, the engine 1 also has an exhaust passage 11.

A turbo-supercharger 4 is provided between the intake passage 8 and the exhaust passage 11. The turbosupercharger 4 includes an exhaust gas turbine comprising a turbine casing 12 located in the exhaust passage 11 and a turbine rotor 13 located in the turbine casing 12. The turbo-supercharger 4 further includes a compressor casing 14 located in the intake passage 8 and a compressor rotor 1 located in the compressor casing 14 The turbine rotor 13 and a compressor rotor 15 are connected together by a shaft 16 to rotate as a unit. As shown in the drawing, the compressor rotor 15 is located upstream the throttle valve 9 and an intercooler 5 is provided between the compressor rotor 15 and the throttle valve 9 to cooled the air compressed by the compressor.

The turbine casing 12 is formed with a bypass passage 17 which is arranged to bypass the turbine and adapted to be closed by an waste gate valve 18. The waste gate valve 18 is connected with a pneumatic actuator 19 which is operated under a pressure in the intake passage 8 downstream the compressor, the pressure being drawn to the actuator 19 through a conduit 20. The actuator 19 functions to open the waste gate valve 18 when the supercharging pressure exceeds a predetermined value.

The turbine casing 12 is formed with a turbine scroll structure having a radially inwardly extending partition wall 12a which divides the turbine scroll into scroll sections 21 and 22. As shown, the scroll section 21 has a smaller passage area than the scroll section 22. In the passage to the scroll section 22 which has a larger passage area, there is provided a shut-off valve 23 which is arranged to close the passage to the scroll section 22. The valve 23 is swingably supported by a pivot shaft 24 and movable from the closed position shown by solid lines clockwise to the open position.

A suction pressure responsive actuator 25 is provided for operating the shut-off valve 23. The actuator 25 includes a casing 29 and a diaphragm 26 disposed in the casing 29. A piston member 27 is attached to the diaphragm 26 to constitute a movable partition 28 which divides the inside space of the casing 29 into a suction pressure chamber 30 and an atmospheric pressure chamber 30a. The partition 28 is connected through a valve operating linkage 31 with the shut-off valve 23. A spring 32 is in the suction pressure chamber 30 to bias the movable partition toward right to thereby urge the valve 23 to the open position. When a suction pressure is introduced into the chamber 30, the partition 28 is displaced toward left against the influence of the spring 32 so that the valve 23 is moved to the closed position.

In order to control the supply of the suction pressure to the chamber 30 of the actuator 25, there is provided a three-way control valve 34 having a casing formed with an outlet port 34a, a suction pressure port 34b and an atmospheric pressure port 34c. In the casing of the control valve 34, there is a movable valve member 34d which is biased by a spring 34e to a position where it closes the suction pressure port 34b. In this position of the valve member 34d, the outlet port 34a is communicated with the atmospheric pressure port 34c. The control valve 34 further has a solenoid 34f which, when energized, functions to move the valve member 34d leftward against the influence of the spring 34e. In this position, the valve member 34d closes the atmospheric pressure port 34c and the suction pressure port 34b is therefore communicated with the outlet port 34a.

The outlet port 34a of the control valve 34 is connected through a conduit 33 with the chamber 30 of the actuator 25. The atmospheric pressure port 34c is connected through conduit 38 with the air cleaner 2 so that the atmospheric pressure is applied to the port 34c. The suction pressure port 34b is connected through a conduit 35 with a port 36 formed in the intake passage 8 downstream the throttle valve 9. In the conduit 35, there is provided a check valve 37 which opens only toward the port 36. It will therefore be understood that a suction pressure can be transmitted from the port 36 to the port 34b. It is preferable to provide a suction pressure reservoir 39 between the check valve 37 and the port 34b so that the suction pressure is stored in the reservoir 39.

In the arrangement described above, when the solenoid 34f is de-energized, the spring 34e forces the valve member 34d toward the port 34b to close the port 34b. Thus, the atmospheric pressure is drawn into the chamber 30 of the actuator 25 so that the partition 28 is displaced toward right to thereby open the shut-off valve 23. When the solenoid 34f is energized, the valve member 34d is displaced toward left to close the atmospheric pressure port 34c. Thus, the suction pressure port 34b is opened to the outlet port 34a so that the suction pressure is drawn to the chamber 30 of the actuator 25. As the result, the partition 28 is displaced toward left to close the shut-off valve 23.

In order to control the operation of the control valve 34, there is provided an electronic control unit 40 which receives an engine speed signal from a speed detector 41 The control unit 40 produces an output when the engine speed is below a predetermined value to energize the solenoid 34f of the control valve 34. Therefore, the suction pressure is introduced into the chamber 30 of the actuator 25 so that the shut-off valve 23 is firmly closed. Under a high speed operation, the solenoid 34f is de-energized so that the shut-off valve 23 is opened as described previously. It should be noted her in that, in the arrangement thus described, whenever the engine main switch is turned off to stop the engine, the shut-off valve 23 is opened. This arrangement is advantageous in that, even when the engine is repeatedly operated only under a low speed, the valve 23 is opened each time when the engine is stopped, so that it is possible to prevent the shut-off valve from being stuck to the valve seat under the influence° of carbon deposits and heat. The suction pressure reservoir 39 is preferable to maintain the suction pressure which will be required for the operation of the actuator 25.

In the arrangement described above, the control unit 40 is designed to produce the solenoid energizing output in accordance with the engine speed signal. In an alternative arrangement, an intake airflow signal may be applied to the control unit 40 from the airflow meter 3 as shown by a phantom line. In this arrangement, the solenoid 34f is energized when the intake airflow is below a predetermined value. In any event, it is possible to obtain a sufficient power for operating the shut-off valve by utilizing the intake suction pressure.

The invention has thus been shown and described with reference to a specific embodiment, however, it should be noted that the invention is in no way limited to the details of the illustrated arrangement but changes and modifications may be made without departing from the scope of the appended claims.

What is claimed:

1. A turbo-supercharger for an internal combustion engine having intake passage means provided with throttle valve means and exhaust passage means, said turbo-supercharger comprising compressor means located in said intake passage means, exhaust gas turbine means provided in said exhaust gas passage means and connected with said compressor means to drive the same, variable nozzle means provided in said exhaust passage means upstream of and adjacent to said turbine means for changing effective area of the exhaust passage means leading to said turbine means, said variable nozzle means having at least a first position and a second position wherein an effective passage area is larger than that in said first position, biasing means for biasing the variable nozzle means to said second position, first pneumatic actuator means responsive to a suction pressure for actuating the variable nozzle means to said first position, suction pressure passage means connecting the intake passage means downstream the throttle valve means with the actuator means to apply the suction pressure to said actuator means in a low engine speed range, waste gate means including waste passage means provided in said exhaust passage means to bypass the exhaust gas turbine means and waste gate valve means provided in said waste passage means, second pneumatic actuator means for actuating said waste gate valve means, supercharging pressure passage means between said second pneumatic actuator means and a portion of the intake passage means downstream of the compressor means and upstream of the throttle valve means to operate the second pneumatic actuator means in accordance with the supercharging pressure to open the waste gate valve means when the supercharging pressure is above a predetermined value.

2. A turbo-supercharger in accordance with claim 1 in which said suction pressure passage means is provided with suction pressure retaining means for retaining the suction pressure and control valve means provided between said retaining means and said actuator means for controlling a supply of the suction pressure to said actuator means.

3. A turbo-supercharger in accordance with claim 2 in which said retaining means is check valve means which allows transmittal of the suction pressure only toward the actuator means.

4. A turbo-supercharger in accordance with claim 2 in which said control valve means is three-way valve means which alternately connect the actuator means to said retaining means and atmosphere.

5. A turbo-supercharger in accordance with claim 4 in which said three-way valve means includes means for normally biasing toward a position wherein the actuator means is connected with the atmosphere.

6. A turbo-supercharger for an internal combustion engine having intake passage means provided with throttle valve means and exhaust passage means, said turbo-supercharger comprising compressor means located in said intake passage means, exhaust gas turbine means provided in said exhaust gas passage means and connected with said compressor means to drive the same, variable nozzle means provided in said exhaust passage means upstream of and adjacent to said turbine means for changing effective area of the exhaust passage means leading to said turbine means, said variable nozzle means having at least a first position and a second position wherein an effective passage area is larger than that in said first position, biasing means for biasing the variable nozzle means to said second position first pneumatic actuator means responsive to a suction pressure for actuating the variable nozzle means to said first position, suction pressure passage means connecting the intake passage means downstream the throttle valve means with the actuator means to apply the suction pressure to said actuator means in a low engine speed range, waste gate means including waste passage means provided in said exhaust passage means to bypass the exhaust gas turbine means and waste gate valve means provided in said waste passage means, second pneumatic actuator means for actuating said waste gate valve means, supercharging pressure passage means between said second pneumatic actuator means and a portion of the intake passage means downstream of the compressor means and upstream of the throttle valve means to operate the second pneumatic actuator means in accordance with the supercharging pressure to open the waste gate valve means when the supercharging pressure is above a predetermined value, in which said suction pressure passage means is provided with suction pressure retaining means for retaining the suction pressure and control valve means provided between said retaining means and said actuator means for controlling a supply of the suction pressure to said actuator means, in which said retaining means is check valve means which allows transmittal of the suction pressure only toward the actuator means, and which further includes suction pressure reservoir means located between the retaining means and the control valve means.

7. A turbo-supercharger in accordance with claim 1 in which said compressor means is located upstream the throttle valve means, said actuator means including suction pressure responsive diaphragm means, said biasing means including spring means for biasing said diaphragm means in one direction.

8. A turbo-supercharger in accordance with claim 2 in which said control valve means is of a solenoid type which allows the suction pressure to pass to the actuator means when energized and applies atmospheric pressure to the actuator means when de-energized, control means responsive to engine operating conditions for energizing the control valve means under an engine operating condition corresponding to a low speed engine operation.

9. A turbo-supercharger in accordance with claim 1 in which said variable nozzle means includes at least two scrolls for passing the exhaust gas to the turbine means and exhaust flow valve means for restricting exhaust gas flow through at least one of the scrolls.

10. A turbo-supercharger in accordance with claim 9 in which said exhaust flow valve means includes shut-off valve means which closes one of the scrolls to define said first position and opens said one scroll to define said second position.

* * * * *